(12) United States Patent
Ling et al.

(10) Patent No.: US 11,754,784 B2
(45) Date of Patent: Sep. 12, 2023

(54) GRATING COUPLER

(71) Applicant: Cisco Technology, Inc., San Jose, CA (US)

(72) Inventors: Tao Ling, Breinigsville, PA (US); Shiyi Chen, Breinigsville, PA (US); Xunyuan Zhang, Mechanicsburg, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/447,153

(22) Filed: Sep. 8, 2021

(65) Prior Publication Data

US 2023/0074516 A1   Mar. 9, 2023

(51) Int. Cl.
| | |
|---|---|
| *G02B 6/34* | (2006.01) |
| *G02B 6/122* | (2006.01) |
| *F21V 8/00* | (2006.01) |
| *G02B 6/124* | (2006.01) |

(52) U.S. Cl.
CPC ............ *G02B 6/1228* (2013.01); *G02B 6/0026* (2013.01); *G02B 6/1223* (2013.01); *G02B 6/124* (2013.01)

(58) Field of Classification Search
CPC ................................. G02B 6/34; G02B 6/124
See application file for complete search history.

(56) References Cited

U.S. PATENT DOCUMENTS

| | | | | |
|---|---|---|---|---|
| 5,033,812 A * | 7/1991 | Yoshida et al. | ........ | G02B 6/124 385/37 |
| 5,101,459 A * | 3/1992 | Sunagawa | ............... | G02B 6/34 385/37 |
| 5,208,882 A * | 5/1993 | Strasser et al. | .......... | G02B 6/34 385/37 |
| 2004/0156589 A1* | 8/2004 | Gunn, III et al. | .. | G02B 6/12004 385/37 |

(Continued)

OTHER PUBLICATIONS

Hong, J. et al. A high efficiency silicon nitride waveguide grating coupler with a multilayer bottom reflector. Scientific Reports 9:12988, (2019).

Maire, G. et al. High efficiency silicon nitride surface grating couplers. Opt. Exp. 16(1), 328-333 (2008).

(Continued)

*Primary Examiner* — Eric Wong
(74) *Attorney, Agent, or Firm* — Patterson + Sheridan, LLP

(57) ABSTRACT

Embodiments presented in this disclosure generally relate to an optical device having a grating coupler for redirection of optical signals. One embodiment includes a grating coupler. The grating coupler generally includes a waveguide layer, a thickness of a waveguide layer portion of the waveguide layer being tapered, the thickness defining a direction, and a grating layer disposed above the waveguide layer and perpendicular to the direction where at least a grating layer portion of the grating layer overlaps the waveguide layer portion of the waveguide layer along the direction. Some embodiments are directed to grating coupler implemented with material layers above and a reflector layer below a grating layer, facilitating redirection and confinement of light that improves coupling loss and bandwidth. The material layers and reflector layer above and below the grating layer may be implemented with or without the waveguide layer being tapered.

15 Claims, 8 Drawing Sheets

(56) References Cited

U.S. PATENT DOCUMENTS

| | | |
|---|---|---|
| 2017/0269297 A1 | 9/2017 | Popovic |
| 2018/0095199 A1 | 4/2018 | Li et al. |
| 2018/0188450 A1 | 7/2018 | Patel et al. |
| 2019/0094467 A1 | 3/2019 | Hassan et al. |
| 2020/0341200 A1 | 10/2020 | Van Vaerenbergh et al. |

OTHER PUBLICATIONS

Marchetti, R. et al. High-efficiency grating-couplers: demonstration of a new design strategy. Scientific Reports 7:16670 (2017).

Tokushima, M. et al, Anti-phase reflection coating maximizing the directionality of grating couplers. Opt. Exp. 24(10), 11075-11084 (2016).

\* cited by examiner

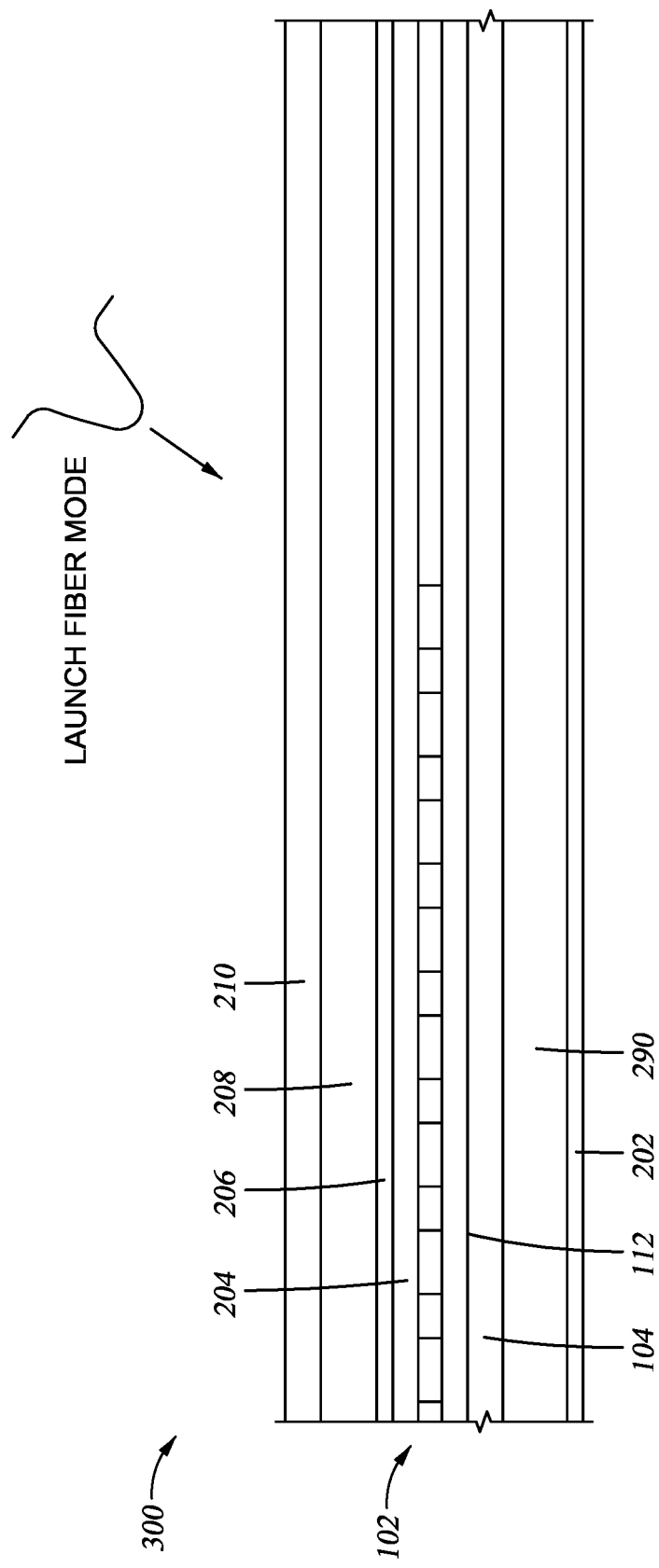

GRATING COUPLER

TECHNICAL FIELD

Embodiments presented in this disclosure generally relate to an optical device. More specifically, embodiments disclosed herein are directed to an optical device having a grating coupler for redirection of optical signals.

BACKGROUND

A grating coupler is a photonic component that can be used for coupling light in to or out of an integrated photonic circuit from/to a fiber or laser to be used for wafer-level optical testing and characterization. A grating coupler includes a grating layer on top of or embedded in a waveguide. The grating facilitates redirection of light to or from a waveguide. For example, light from the waveguide may be redirected to a fiber, or light from the fiber may be redirected to the waveguide.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3A illustrates a grating coupler with thin film layers above and below a waveguide layer and without a tapered waveguide, in accordance with certain embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
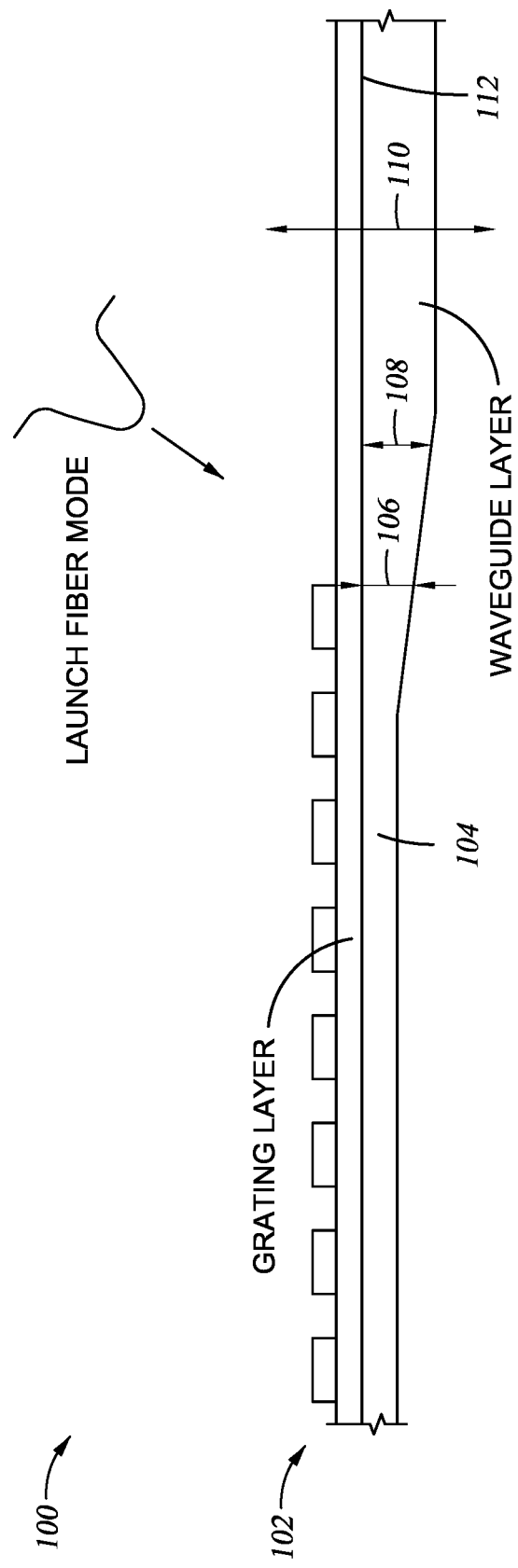
FIG. 1A illustrates a thickness tapered grating coupler, in accordance with certain embodiments of the present disclosure.

Embodiments presented in this disclosure generally relate to an optical device. More specifically, embodiments disclosed herein are directed to an optical device having a grating coupler for redirection of optical signals.

One embodiment of the present disclosure provides a grating coupler. The grating coupler generally includes a waveguide layer, a thickness of a waveguide layer portion of the waveguide layer being tapered, the thickness defining a direction, and a grating layer disposed above the waveguide layer and perpendicular to the direction, wherein a grating layer portion of the grating layer overlaps the waveguide layer portion of the waveguide layer along the direction.

One embodiment of the present disclosure provides a grating coupler. The grating coupler generally includes a waveguide layer, a grating layer disposed above the waveguide layer, a reflector layer disposed below the waveguide layer, a first layer disposed above the grating layer, a second layer disposed above the first layer, the first layer and the second layer being configured to redirect light to or from the waveguide layer, and a dielectric layer disposed between the first layer and the second layer, the first layer and the second layer having a different material than the dielectric layer.

One embodiment of the present disclosure provides a method that generally includes receiving an optical signal to be provided to a waveguide layer of a grating coupler, the grating coupler having a grating layer disposed above the waveguide layer, and redirecting, via the grating coupler, the optical signal to or from the waveguide layer, wherein a thickness of a waveguide layer portion of the waveguide layer is tapered, the thickness defining a direction, wherein the grating layer is perpendicular to the direction, and at least a grating layer portion of the grating layer overlaps the waveguide layer portion of the waveguide layer along the direction.

EXAMPLE EMBODIMENTS

Certain embodiments of the present disclosure are directed to a design of a high efficiency and broadband integrated photonics-based grating coupler. The grating coupler may operate in an original-band (O-band) coarse wavelength division multiplexing (CWDM) wavelength window. The O-band ranges from 1260 nm to 1360 nm. While some examples are described with respect to a grating coupler that can operate in the O-band, the embodiments of the present disclosure are applicable to grating coupler for optical communication in any suitable bands.

In some embodiments, a thickness tapered waveguide structure is used in the grating coupler to improve the grating coupler coupling loss. Some embodiments provide a waveguide structure with thin-film layers above a grating layer and a reflector layer (e.g., another thin film layer) below the grating layer. Certain implementations presented herein may include a grating coupler having both a thickness tapered waveguide layer, as well as thin-film layers above and below the grating layer, providing further improvements to the grating coupler operation as described in more detail herein.

FIG. 1A illustrates a thickness tapered grating coupler 100, in accordance with certain embodiments of the present disclosure. As shown, the grating coupler 100 includes a waveguide layer 104 and a grating layer 102 (e.g., a silicon grating layer). As shown, a fiber mode (an optical signal) may be launched towards the grating coupler. The grating layer 102 may redirect the optical signal to flow in the waveguide layer 104. Similarly, the grating layer 102 may redirect an optical signal received from the waveguide layer 104 (e.g., towards a fiber optic cable).

In accordance with certain embodiments, the thickness of the waveguide layer 104 is tapered. For example, the waveguide layer 104 has a first thickness 106 at one position of the waveguide layer 104 and a second different thickness 108 at another position of the waveguide layer 104. In some embodiments, the waveguide layer may be tapered from a thickness of 0.2 microns to a thickness of 0.9 microns over a length of 9 microns.

The thickness (e.g., the tapered thickness) of the waveguide layer 104 defines a direction 110, as shown. The grating layer 102 disposed above the waveguide layer 104 is perpendicular to the direction 110, in some aspects. Moreover, a portion of the grating layer is disposed at least partially above the tapered portion of the waveguide layer. In other words, at least a portion of the grating layer 102 overlaps the tapered portion of the waveguide layer 104 along the direction 110.

As shown, a dielectric layer 112 is disposed between the waveguide layer 104 and the grating layer 102. Since upcoming fiber mode designs have an angle spread, implementing the waveguide layer 104 with a taper is more effective in collecting light from different angles due to the gradient of the effective index of the guide mode in the waveguide and providing different phase-matching conditions for the light from different angles. The tapered structure of the waveguide layer may be realized in a grayscale lithography process.

Figure 1B:
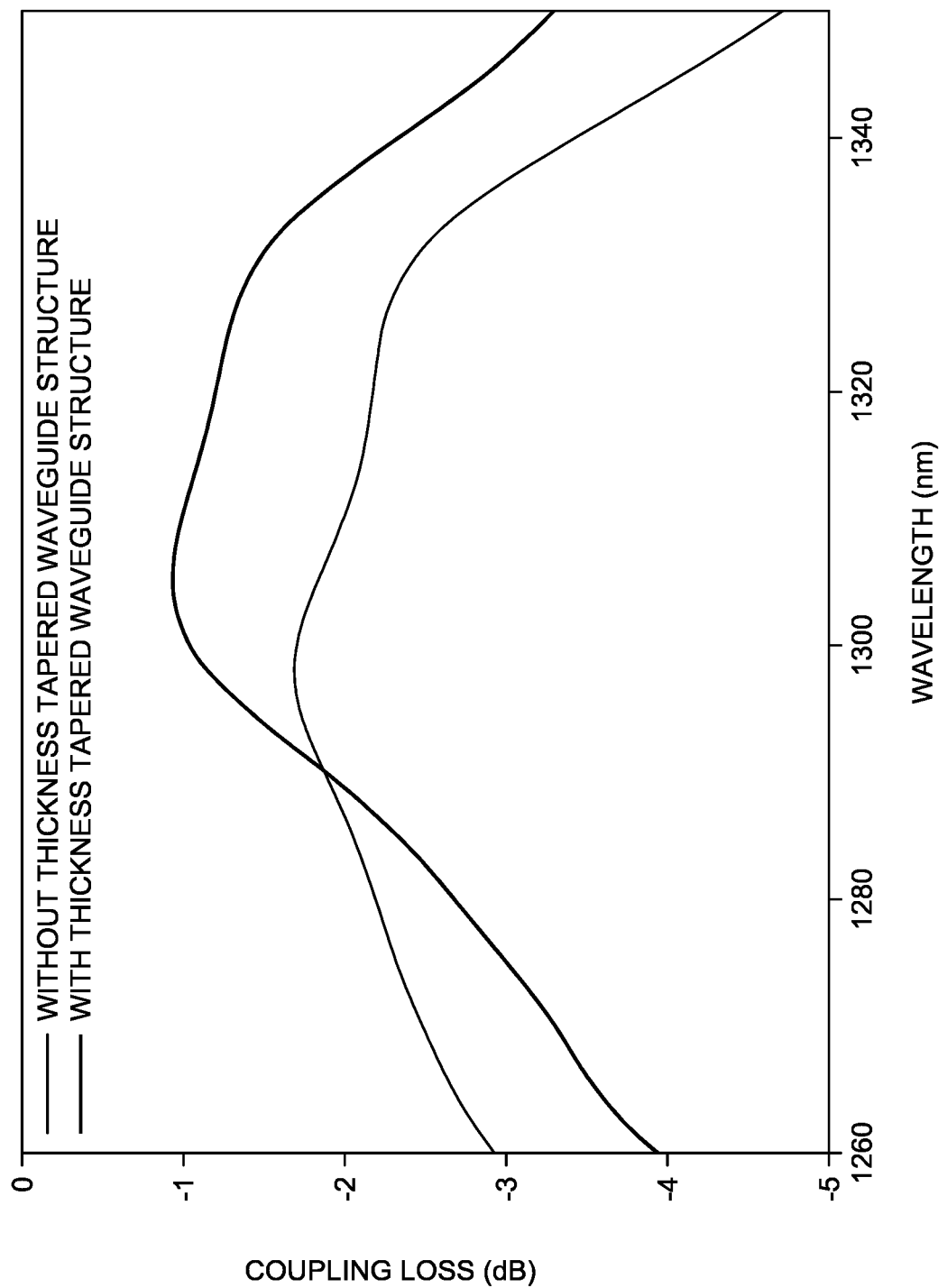
FIG. 1B is a graph illustrating the coupling loss of a grating coupler with and without a tapered waveguide structure, in accordance with certain embodiments of the present disclosure.

FIG. 1B is a graph illustrating the coupling loss of a grating coupler with and without a tapered waveguide structure, in accordance with certain embodiments of the present disclosure. As shown, with the thickness tapered waveguide structure in the waveguide layer, the peak coupling loss is improved by around 0.8 dB.

Figure 2A:
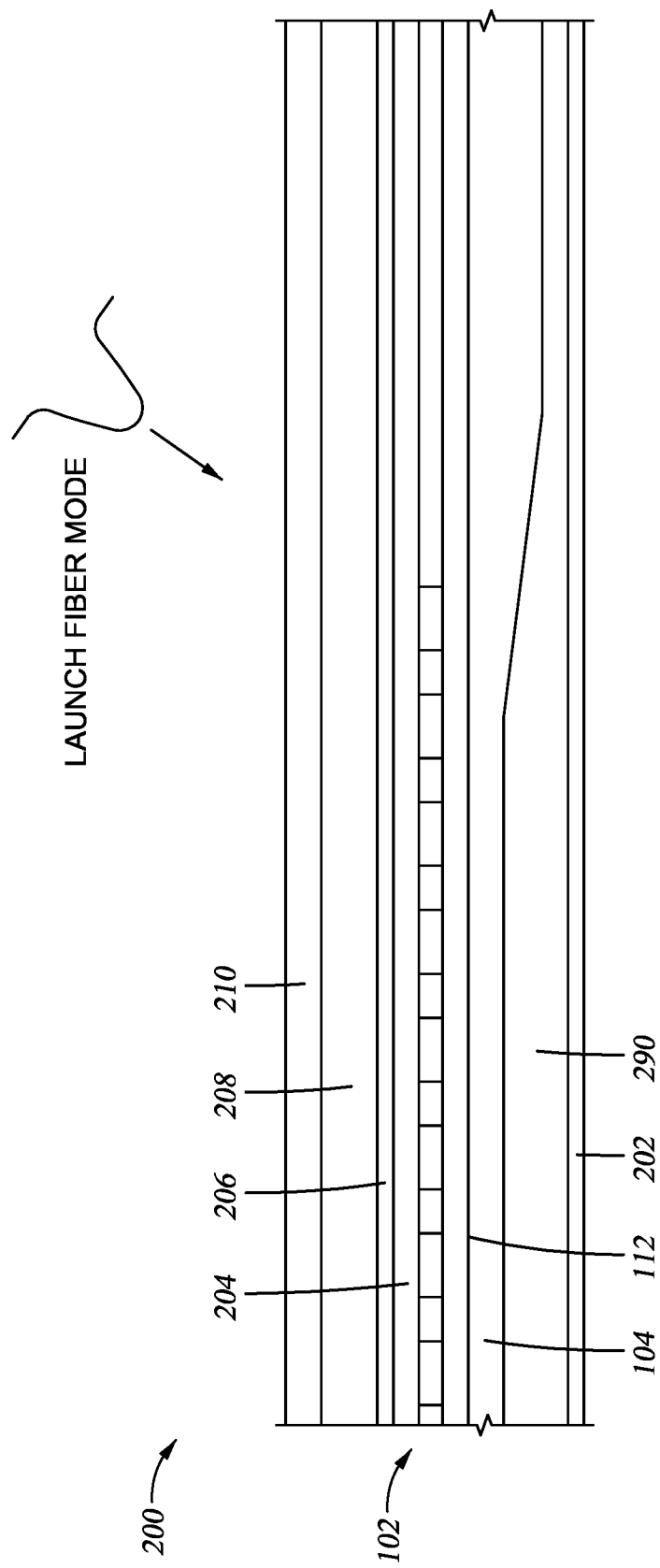
FIG. 2A illustrates a grating coupler with thin film layers above and below a tapered waveguide layer, in accordance with certain embodiments of the present disclosure.

FIG. 2A illustrates a grating coupler 200 with thin-film layers above and below a tapered waveguide layer 104, in accordance with certain embodiments of the present disclosure. To further improve coupling loss and bandwidth, thin-film layers with a specific material composition, thickness and position may be deposited both on top and bottom of the grating layer. For example, a reflector layer 202 (e.g., a thin-film layer) may be disposed below the waveguide layer 104. Moreover, a first material layer 206 (e.g., a thin film layer) and a second material layer 210 (e.g., a thin film layer) are disposed above the waveguide layer 104 and the grating layer 102, as shown. In some embodiments, the first material layer 206 may have a thickness of 0.5 microns, the second material layer 210 may have a thickness of 0.9 microns, and the reflector layer 202 may have a thickness of 0.5 microns.

A dielectric layer 204 may be disposed between the grating layer 102 and the first material layer 206, a dielectric layer 208 may be disposed between the first material layer 206 and the second material layer 210, and a dielectric layer 290 may be disposed between the waveguide layer 104 and the reflector layer 202. In some embodiments, the dielectric layer 204 may have a thickness of 0.6 microns, and the dielectric layer 208 may have a thickness of 3 microns. The first material layer 206 has a different material than dielectric layers 204, 208, 290, and the second material layer 210 has a different material than dielectric layers 204, 208, 290, in some embodiments. For instance, the material layers 206, 210 may be silicon nitride layers (or any dielectric layers), and the dielectric layers 204, 208, 290 may be made of silicon dioxide. In some aspects, the reflector layer 202 may include any dielectric layer, including silicon, or silicon nitride. The thin film layers above and below the waveguide layer 104 facilitate improvement of peak coupling loss and bandwidth, as described in more detail with respect to FIGS. 2B and 2C.

Figure 2B:
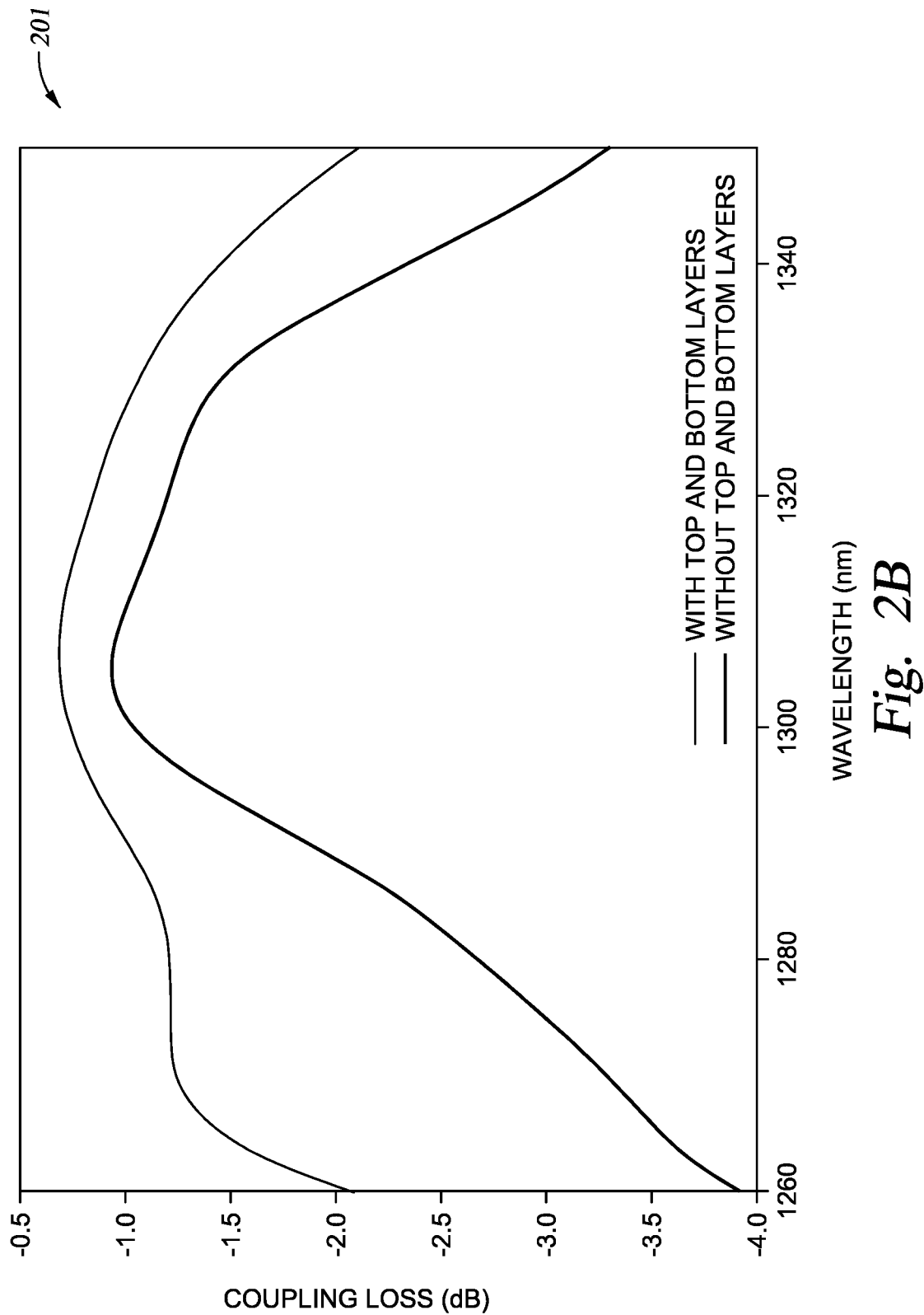
FIG. 2B is a graph illustrating the coupling loss of a grating coupler with and without top thin film layers and a bottom thin film layer, in accordance with certain embodiments of the present disclosure.

FIG. 2B is a graph 201 illustrating the coupling loss of a grating coupler with and without the top thin-film layers (e.g., materials layers 206, 210) and the bottom thin-film layer (e.g., reflector layer 202), in accordance with certain embodiments of the present disclosure. As shown by graph 201 of FIG. 2B, using the top and bottom thin film layers, a grating design with a peak coupling loss of -0.69 dB is achieved with a 1 dB bandwidth of around 83 nm, which fits in the O-band CWDM window. A grating design with a peak coupling loss of around -0.9 dB and 1 dB bandwidth of around 45 nm is achieved without the top and bottom thin film layers. Thus, by adding thin-film coating layers with a material composition, thickness and position set to improve coupling loss and bandwidth, both on top and underneath the grating coupler, the peak coupling loss and bandwidth are improved.

The reflector layer 202 serves to reflect light towards the waveguide layer 104. The material layers 206, 210 redirect light to different angles, allowing greater coupling of light to the waveguide layer 104. Thus, the reflector 202, together with the material layers 206, 210 serve to confine light between the material layer 206 and the reflector layer 202, while also redirecting light to different angles, which help improve the coupling loss and bandwidth.

Figure 2C:
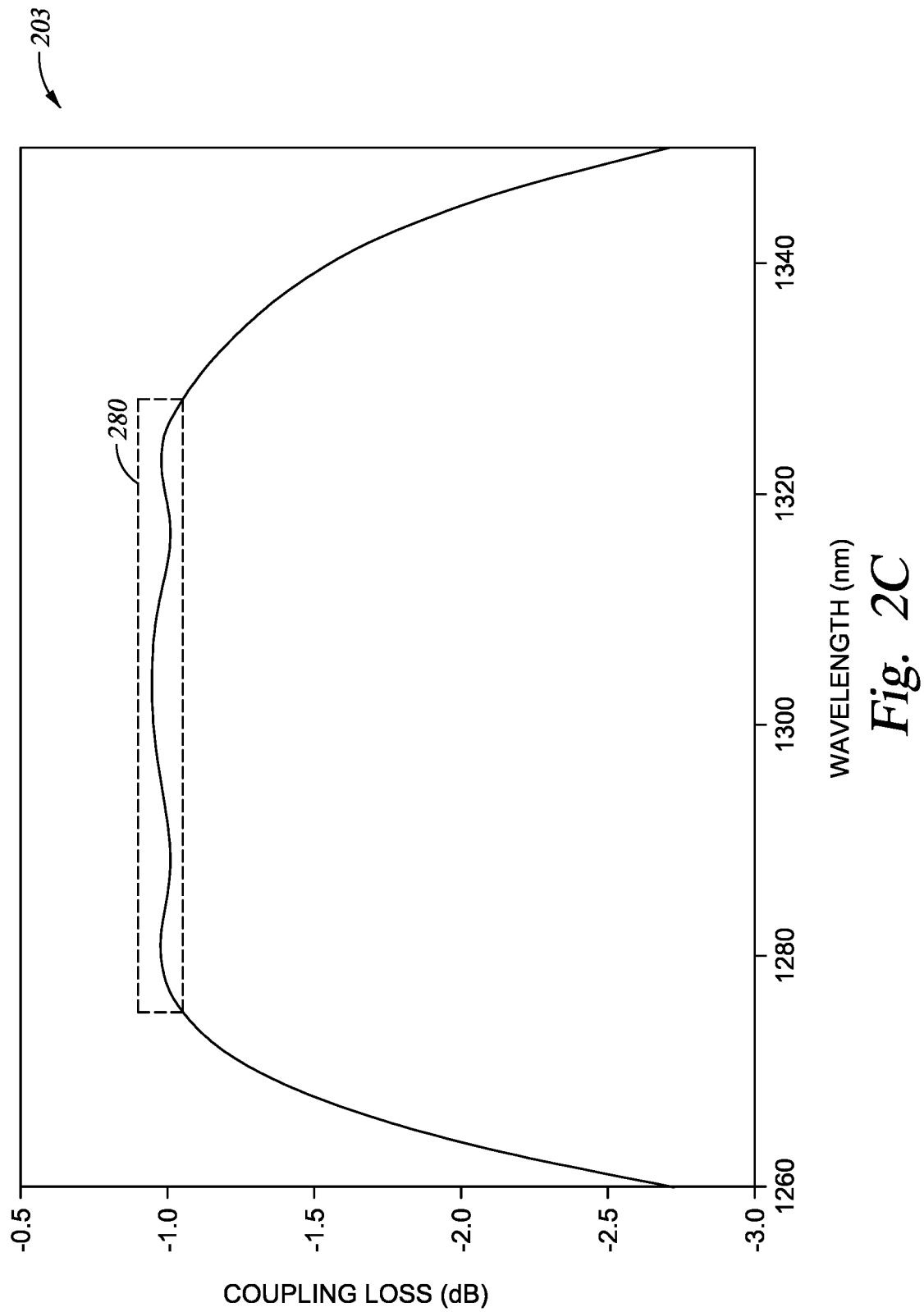
FIG. 2C is a graph illustrating the coupling loss of a grating coupler with a flat-top spectrum response, in accordance with certain embodiments of the present disclosure.

FIG. 2C is a graph 203 illustrating the coupling loss of a grating coupler with a flat-top spectrum response, in accordance with certain embodiments of the present disclosure. A flat-top spectrum response may be implemented by setting the slope associated with the tapering of the waveguide structure's thickness. For example, as shown by graph 203 of FIG. 2C, a flat-top coupling loss spectrum response is achieved by setting the slope of the thickness tapered waveguide structure along with the implementation of the top and bottom thin film layers. As shown, a 48 nm flat-top spectrum response (e.g., with -1 dB coupling loss) and a ripple of less than 0.1 dB is achieved. In other words, region 280 of the spectrum response has a relatively flat shape with a ripple that is less than 0.1 dB.

Figure 3B:
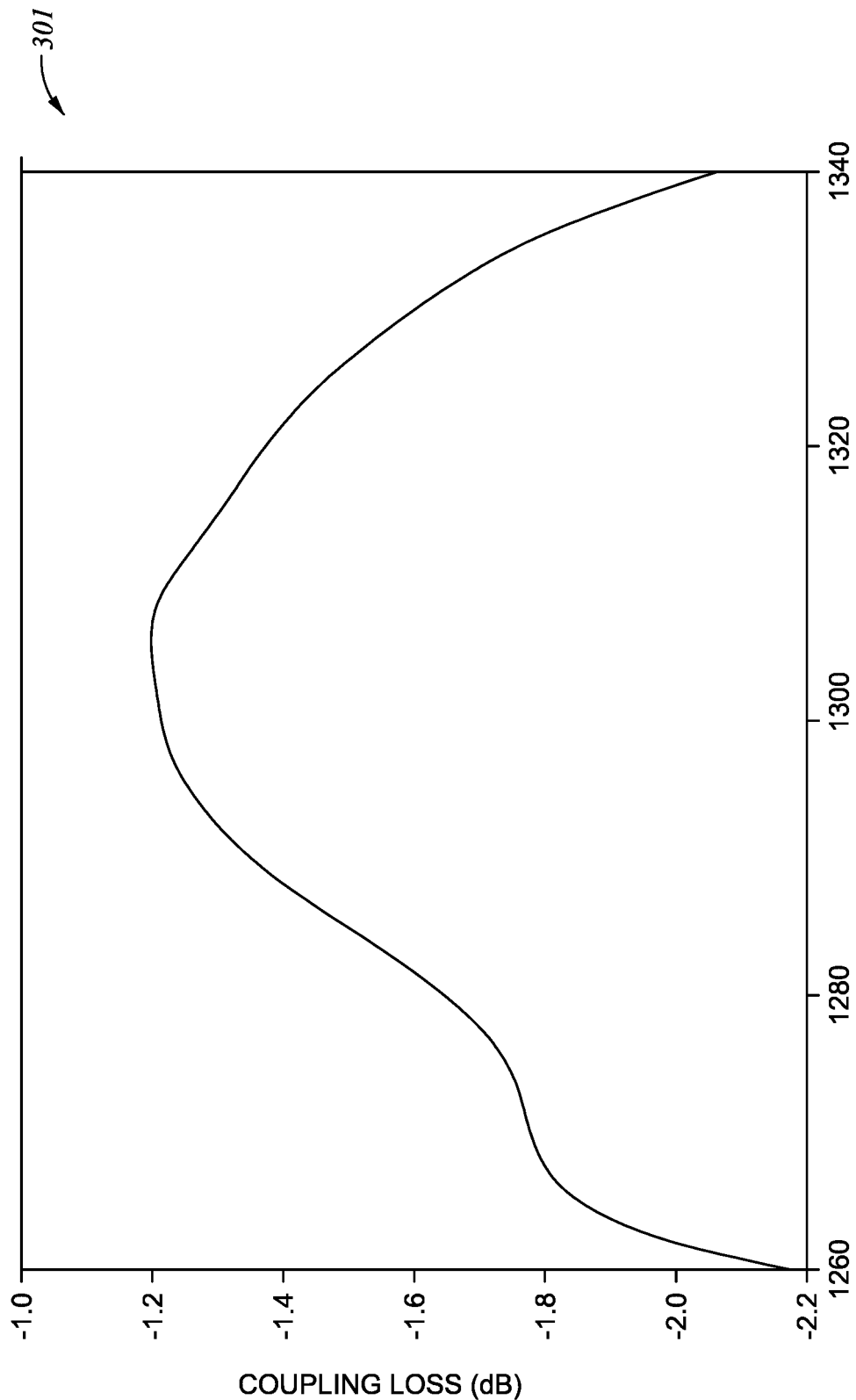
FIG. 3B is a graph illustrating the coupling loss of a grating coupler with the top and bottom thin film layers and without a tapered waveguide, in accordance with certain embodiments of the present disclosure.

FIG. 3A illustrates a grating coupler 300 with thin-film layers (e.g., material layers 206, 210) above the waveguide layer 104 and a thin-film layer (e.g., reflector layer 202) below the waveguide layer 104, in accordance with certain embodiments of the present disclosure. As shown, the waveguide layer 104 is not tapered in this implementation. Without the thickness taper structure (e.g., with only the thin film layers above and below the waveguide layer 104), a grating design with peak coupling loss -1.2 dB is achieved with a 1 dB bandwidth above 80 nm, as described in more detail with respect to FIG. 3B.

As described herein, thin-film layers with a specific material composition, thickness and position may be deposited both on top and bottom of the grating layer 102 and waveguide layer 104 to improve coupling loss and bandwidth. For example, the reflector layer 202 may be disposed below the waveguide layer 104 and the grating layer 102. Moreover, the first material layer 206 and the second material layer 210 are disposed above the waveguide layer 104 and the grating layer 102, as shown. In some embodiments, the first material layer 206 may have a thickness of 0.5 microns, the second material layer 210 may have a thickness of 0.9 microns, and the reflector layer 202 may have a thickness of 0.5 microns.

As shown, the dielectric layer 204 is disposed between the grating layer 102 and the first material layer 206, the dielectric layer 208 is disposed between the first material layer 206 and the second material layer 210, and the dielectric layer 290 is disposed between the waveguide layer 104 and the reflector layer 202. In some embodiments, the dielectric layer 204 may have a thickness of 0.6 microns, and the dielectric layer 208 may have a thickness of 3 microns.

In some implementations, the first material layer 206 has a different material than dielectric layers 204, 208, 290, and the second material layer 210 has a different material than dielectric layers 204, 208, 290. For instance, as described herein, the material layers 206, 210 may be silicon nitride layers (or any dielectric layers), and the dielectric layers 204, 208, 290 may be made of silicon dioxide. In some aspects, the reflector layer 202 may include any dielectric, such as silicon, silicon nitride, or nitride.

FIG. 3B is a graph 301 illustrating the coupling loss of a grating coupler with the top thin-film layers (e.g., materials layers 206, 210) and the bottom thin-film layer (e.g., reflector layer 202), but without a tapered waveguide, in accordance with certain embodiments of the present disclosure. As shown, a peak coupling loss of around -1.2 dB and a 1 dB bandwidth of around ~80 nm may be achieved, which covers the O-band CWDM window. As described with respect to FIG. 2B, with the tapered waveguide, a peak coupling loss of around -0.69 dB is achieved with a 1 dB bandwidth of around 83 nm. Thus, by implementing the waveguide layer with uniform thickness, the coupling loss is varied from -0.69 dB to -1.2 dB.

The embodiments presented herein provide various advantages as described herein. For example, a high coupling loss with a peak coupling loss of about 0.69 dB and a broadband spectrum response with a 1 dB bandwidth of about 83 nm is achieved using thin-film layers both on top and underneath the waveguide layer. With a thickness tapered waveguide structure in the waveguide layer, coupling loss and bandwidth are further improved over conventional implementations.

A flat-top spectrum response may also be achieved using the tapered waveguide with high coupling loss. Without a thickness taper structure, a grating design with peak coupling loss -1.2 dB is achieved with a 1 dB bandwidth above 80 nm, which also fits in the O-band CWDM window.

Figure 4:
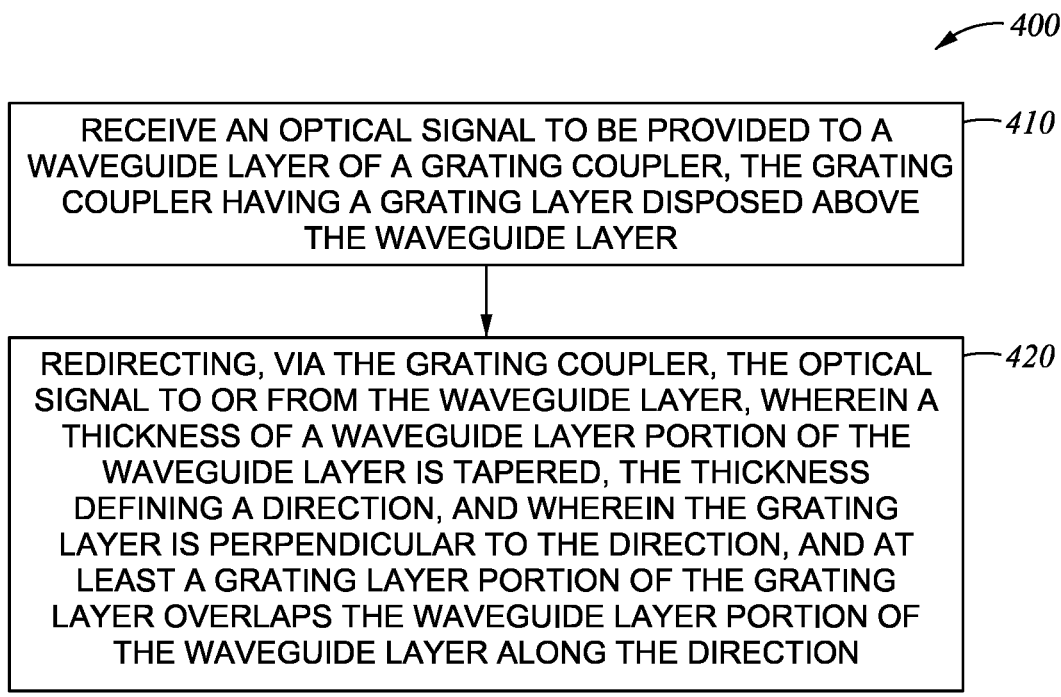
FIG. 4 is a flow diagram illustrating example operations for redirecting an optical signal using a grating coupler, in accordance with certain embodiments of the present disclosure.

FIG. 4 is a flow diagram illustrating example operations 400 for redirecting an optical signal using a grating coupler, in accordance with certain embodiments of the present disclosure. Operations 400 may be performed by a grating coupler, such as the grating coupler 100, 200 or 300.

Operations 400 begin, at block 410, with the grating coupler receiving an optical signal to be provided to a waveguide layer (e.g., waveguide layer 104) of the grating coupler, the grating coupler having a grating layer (e.g., grating layer 102) disposed above the waveguide layer.

At block 420, the grating layer redirects the optical signal to or from the waveguide layer. In some embodiments, a thickness of a waveguide layer portion of the waveguide layer is tapered.

As described herein, the thickness of the waveguide layer defines a direction (e.g., direction 110 shown in FIG. 1A). Moreover, the grating layer is perpendicular to the defined direction.

In some embodiments, a grating layer portion of the grating layer may be disposed at least partially above (e.g., directly above) the tapered portion of the waveguide layer. For example, at least a grating layer portion of the grating layer overlaps the waveguide portion of the waveguide layer along the direction defined by the thickness of the waveguide layer.

In some embodiments, the grating coupler also includes a reflector layer (e.g., reflector layer 202 shown in FIGS. 2A and 3A) disposed below the waveguide. A first layer (e.g., material layer 206) may be further disposed above the grating layer. The grating coupler also includes a second layer (e.g., material layer 210) disposed above the first layer in some embodiments. In some implementations, the grating coupler includes a dielectric layer (e.g., dielectric layer 208) disposed between the first layer and the second layer.

In some embodiments, the first layer and the second layer are implemented with a different material than the dielectric layer. For example, the first layer and the second layer may include nitride, whereas the dielectric layer may include silicon dioxide. The reflector layer may include any dielectric, including silicon, or silicon nitride.

In some embodiments, a thickness of the second layer is greater than the thickness of the first layer. In some embodiments, a dielectric layer (e.g., dielectric layer 112) is coupled between the waveguide layer and the grating layer.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments.

Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A grating coupler, comprising:
   a waveguide layer comprising a non-tapered portion and a tapered portion where a thickness of a waveguide layer in the tapered portion is tapered, the thickness defining a direction; and
   a grating layer disposed above the waveguide layer and perpendicular to the direction, the grating layer comprising a plurality of gratings wherein a lesser number of the plurality of gratings overlap the tapered portion of the waveguide layer and a greater number of the plurality of gratings overlap the non-tapered portion of the waveguide layer.

2. The grating coupler of claim 1, further comprising:
   a reflector layer disposed below the waveguide layer; and a first layer disposed above the grating layer.

3. The grating coupler of claim 2, further comprising a second layer disposed above the first layer.

4. The grating coupler of claim 3, further comprising a dielectric layer disposed between the first layer and the second layer, the first layer and the second layer having a different material than the dielectric layer.

5. The grating coupler of claim 3, wherein the first layer and the second layer comprise nitride.

6. The grating coupler of claim 3, wherein a thickness of the second layer is greater than a thickness of the first layer.

7. The grating coupler of claim 3, wherein the first layer and the second layer are configured to redirect light to or from the waveguide layer.

8. The grating coupler of claim 1, further comprising a dielectric layer disposed between the waveguide layer and the grating layer.

9. A method, comprising:
receiving an optical signal to be provided to a waveguide layer of a grating coupler, the grating coupler having a grating layer disposed above the waveguide layer; and
redirecting, via the grating coupler, the optical signal to or from the waveguide layer comprising a non-tapered portion and a tapered portion, wherein a thickness of a waveguide layer in the tapered portion is tapered, the thickness defining a direction, and wherein the grating layer is perpendicular to the direction, and the grating layer comprising a plurality of gratings wherein a lesser number of the plurality of gratings overlap the tapered portion of the waveguide layer and a greater number of the plurality of gratings overlap the non-tapered portion of the waveguide layer.

10. The method of claim 9, wherein the grating coupler further comprises:
a reflector layer disposed below the waveguide layer; and
a first layer disposed above the grating layer.

11. The method of claim 10, wherein the grating coupler further comprises a second layer disposed above the first layer.

12. The method of claim 11, wherein the grating coupler further comprises a dielectric layer disposed between the first layer and the second layer, the first layer and the second layer having a different material than the dielectric layer.

13. The method of claim 11, wherein the first layer and the second layer comprise nitride.

14. The method of claim 11, wherein a thickness of the second layer is greater than a thickness of the first layer.

15. The method of claim 11, wherein the grating coupler further comprises another dielectric layer disposed between the waveguide layer and the grating layer.

* * * * *